(12) United States Patent
Marie et al.

(10) Patent No.: US 11,368,504 B2
(45) Date of Patent: Jun. 21, 2022

(54) METHOD FOR GENERATING A DATA STREAM, BROADCAST GATEWAY, METHOD AND DEVICE FOR SELECTING A DATA STREAM AND CORRESPONDING COMPUTER PROGRAM

(71) Applicant: ENENSYS TECHNOLOGIES, Cesson-Sevigne (FR)

(72) Inventors: Jean-Baptiste Marie, Rennes (FR); Benoit Bui Do, Rennes (FR); Alexis Gautier, Mouaze (FR)

(73) Assignee: ENENSYS TECHNOLOGIES, Cesson-Sevigne (FR)

( * ) Notice: Subject to any disclaimer, the term of this patent is extended or adjusted under 35 U.S.C. 154(b) by 0 days.

(21) Appl. No.: 16/626,752

(22) PCT Filed: Jun. 25, 2018

(86) PCT No.: PCT/EP2018/066992
§ 371 (c)(1),
(2) Date: Dec. 26, 2019

(87) PCT Pub. No.: WO2019/002224
PCT Pub. Date: Jan. 3, 2019

(65) Prior Publication Data
US 2020/0128055 A1  Apr. 23, 2020

(30) Foreign Application Priority Data

Jun. 30, 2017 (FR) ...................................... 1756147

(51) Int. Cl.
*H04L 65/611* (2022.01)
*H04H 20/10* (2008.01)
(Continued)

(52) U.S. Cl.
CPC ....... *H04L 65/4076* (2013.01); *H04H 20/103* (2013.01); *H04H 20/24* (2013.01);
(Continued)

(58) Field of Classification Search
None
See application file for complete search history.

(56) References Cited

U.S. PATENT DOCUMENTS 5,903,574 A * 5/1999 Lyons ................... H04L 1/0071
714/704
8,331,365 B2 * 12/2012 Rey ....................... H04L 12/189
370/390

(Continued)

FOREIGN PATENT DOCUMENTS

| EP | 1358553 B1 | 2/2012 |
|---|---|---|
| FR | 3020541 A1 | 10/2015 |
| FR | 3068194 A1 | 12/2018 |

OTHER PUBLICATIONS

Advanced Television Systems Committee, "ATSC Candidate Standard: Scheduler / Studio to Transmitter Link", Document S32-266r16, dated Sep. 30, 2016.
(Continued)

*Primary Examiner* — James A Edwards
(74) *Attorney, Agent, or Firm* — David D. Brush; Westman, Champlin & Koehler, P.A.

(57) ABSTRACT

A method for selecting a data stream for distribution to a plurality of broadcasting sites. The method includes: receiving a main data stream and a back-up data stream respectively, generated by a main broadcast gateway and a secondary broadcast gateway respectively, from source data, called a main stream and a secondary stream respectively; receiving at least one packet including a piece of information representative of a quality of service associated with the main stream and the secondary stream respectively, at one
(Continued)

instant at least or over one given period at least, the at least one packet, called a main current packet and a secondary current packet respectively, being generated by the main broadcast gateway and secondary broadcast gateway respectively; and selecting in real time the main stream or the secondary stream respectively in taking account of the main current packet and secondary current packet, delivering the data stream for distribution.

16 Claims, 2 Drawing Sheets

(51) Int. Cl.
  *H04H 20/24*   (2008.01)
  *H04H 20/74*   (2008.01)
  *H04H 60/82*   (2008.01)
  *H04L 65/1023*  (2022.01)

(52) U.S. Cl.
  CPC ............ *H04H 20/74* (2013.01); *H04H 60/82* (2013.01); *H04L 65/1023* (2013.01)

(56) References Cited

U.S. PATENT DOCUMENTS

| | | | |
|---|---|---|---|
| 9,490,850 B1* | 11/2016 | Paniconi | H04L 1/1621 |
| 2004/0022278 A1* | 2/2004 | Thomas | H04N 21/64322 |
| | | | 370/537 |
| 2006/0126654 A1* | 6/2006 | Nilakantan | H04L 43/0811 |
| | | | 370/437 |
| 2008/0189732 A1* | 8/2008 | Auwens | H04N 21/44008 |
| | | | 725/22 |
| 2010/0183077 A1* | 7/2010 | Lee | H04L 1/0071 |
| | | | 375/240.24 |
| 2013/0322557 A1* | 12/2013 | Poulain | H04N 21/2404 |
| | | | 375/259 |
| 2014/0376359 A1* | 12/2014 | Nishikata | H04L 45/28 |
| | | | 370/217 |
| 2015/0281746 A1 | 10/2015 | Lam | |
| 2017/0310731 A1* | 10/2017 | Thomas | H04L 65/1083 |

OTHER PUBLICATIONS

International Search Report dated Jul. 31, 2018 for corresponding International Application No. PCT/EP2018/066992, filed Jun. 25, 2018.

Written Opinion of the International Searching Authority dated Jul. 31, 2018 for corresponding International Application No. PCT/EP2018/066992, filed Jun. 25, 2018.

International Preliminary Report on Patentability and English translation of the Written Opinion of the International Searching Authority dated Aug. 20, 2018 for corresponding International Application No. PCT/EP2018/066992, filed Jun. 25, 2018.

* cited by examiner

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| RES |||||||||||||||||||||||||||||||| X0 |
| PLP O <63:32> ||||||||||||||||||||||||||||||||
| PLP O <31:0> ||||||||||||||||||||||||||||||||
| PLP NOS <63:32> ||||||||||||||||||||||||||||||||
| PLP NOS <31:0> ||||||||||||||||||||||||||||||||
| RES ||||||||||||||||||||||||||||||||
Fig. 4
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| V(2) || P(0) | X(0) | CC(0) ||| M | PT |||||| SN ||||||||||||||
| TS (0) ||||||||||||||||||||||||||||||||
| RES ||||||| STL-EI PV ||||||| P CC |||||||| P N ||||||||
Fig. 5
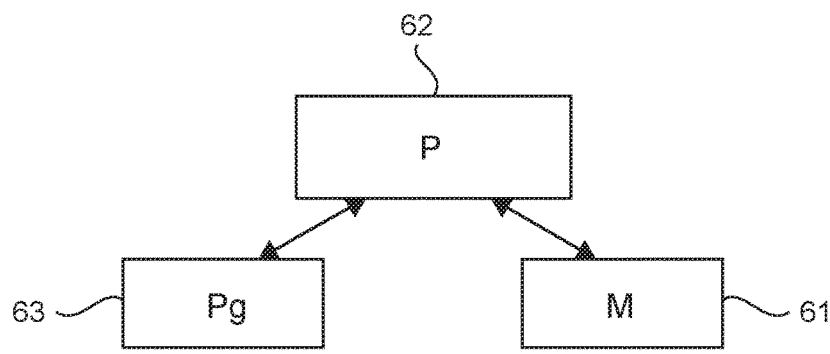
Fig. 6
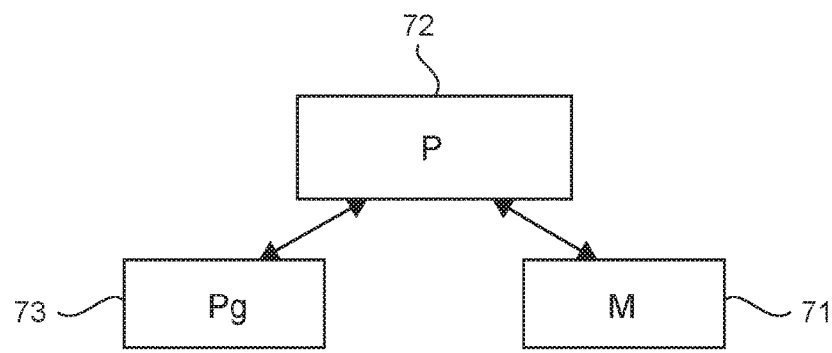
Fig. 7

METHOD FOR GENERATING A DATA STREAM, BROADCAST GATEWAY, METHOD AND DEVICE FOR SELECTING A DATA STREAM AND CORRESPONDING COMPUTER PROGRAM

CROSS-REFERENCE TO RELATED APPLICATIONS

This Application is a Section 371 National Stage Application of International Application No. PCT/EP2018/066992, filed Jun. 25, 2018, which is incorporated by reference in its entirety and published as WO 2019/002224 A1 on Jan. 3, 2019, not in English.

1. FIELD OF THE INVENTION

The field of the invention is that of the distribution and broadcasting of information in a digital broadcasting and distribution network comprising at least one fixed reference site and a plurality of broadcasting sites. More specifically, the invention proposes a solution to improve the broadcasting of information, for example that of television programs.

The term "fixed reference site" is understood here to mean an entity used to shape contents and distribute them in a distribution network. For example, such an entity is a network head-end.

The term "broadcasting site" is understood to mean an entity used to receive contents distributed in a distribution network and broadcast them towards individual receivers. Classically, broadcasting sites are laid out in distinct geographical sites.

The invention can be applied more particularly but not exclusively to distribution networks according to the ATSC (Advanced Television Systems Committee) standard, especially the ATSC3.0 standard.

2. PRIOR ART

Here below, referring to FIG. 1, an example is presented of a distribution network according to the ATSC3.0 standard implementing a head-end 11 and a plurality of broadcasting sites 121, 122 laid out in distinct geographical sites.

At the head-end, source data to be distributed (for example of the data, audio and/or video, and so on, service type) are processed. For example, the source data are compressed and then formatted in order to be transmitted to broadcasting sites. In particular, the source data can be encapsulated in baseband packets which can be encapsulated, along with signaling information, in PLP (Physical Layer Pipe). This processing step can especially be implemented in a broadcast gateway 111.

According to the ATSC3.0 standard, the data stream obtained at output from the broadcast gateway 111 is of the STL (studio-to-transmitter link) type. The STL packets of the data stream can be encapsulated in IP/RTP packets for distribution to the broadcasting sites 121, 122.

The structure of such a data stream is described in detail for example in the document "ATSC Candidate Standard: Scheduler/Studio to Transmitter Link", Document S32-266r16-30 Sep. 2016.

The distribution path of the data stream, in the form of IP packets, between the head-end 11 and the broadcasting sites 121, 122 can be a satellite link 131, an IP network link 132, a radio-frequency link or an fiber-optic link, etc.

Each broadcasting site 121, 122 receives one version of the data stream generated by the head-end 11, possibly delayed, and implements a physical layer modulator 1211, 1221, enabling the conversion of the received data stream to broadcast it in the form of a wireless signal, i.e. it is transmitted over the air, especially towards individual receivers 141, 142.

In order to improve the security of the distribution and broadcasting networks, there are known ways of adding redundancy to the different devices.

For example, as illustrated in FIG. 2, in the head-end 111, the broadcast gateway 111, called the main broadcast gateway, can be secured by a secondary broadcast gateway 112. In the event of a failure of the main broadcast gateway 111, the secondary broadcast gateway 112 is responsible for generating the STL data stream intended for transmission to the broadcasting sites.

The switchover between the main broadcast gateway and the secondary broadcast gateway can be done through a switch 113 enabling distribution of the STL stream generated by the secondary broadcast gateway 112 in the event of a failure in the main broadcast gateway 111.

One drawback of this technique is that it provides for the managing only of a case of failure in the main broadcast gateway 111, i.e. when the switch 13 receives no STL stream from the main broadcast gateway 111. This technique therefore cannot be used to detect whether an STL stream is carrying a deteriorated or failed service, and can hence play a part in the distribution and then the broadcasting of a data stream carrying a deteriorated or failed service.

3. SUMMARY OF THE INVENTION

In one embodiment, the invention proposes a solution that does not have all the drawbacks of the prior art, in the form of a method for selecting a data stream intended for distribution to a plurality of broadcasting sites, comprising:

the reception of a main data stream, generated by a main broadcast gateway from source data, called a main stream, the reception of at least one packet comprising a piece of information representative of a quality of service associated with the main stream, at one instant at least or over one given period at least, said at least one packet, called a main current packet, being generated by said main broadcast gateway, the reception of a back-up data stream, generated by a secondary broadcast gateway from said source data, called a secondary stream, the reception of at least one packet comprising a piece of information representative of a quality of service associated with the secondary stream, at said one instant at least or over said one given period at least, said at least one packet, called a secondary current packet, being generated by said secondary broadcast gateway, and the selection in real time of the main stream or of the secondary stream, in taking account of said main current packet and secondary current packet, delivering the data stream intended for distribution to a plurality of broadcasting sites.

The selection device or switch according to at least one embodiment of the invention thus has information available on the current state of the broadcast gateways and their inputs, and can thus choose whether to distribute the main stream generated by the first broadcast gateway or the secondary stream generated by the second broadcast gateway.

In particular, it can be noted that the first and second broadcast gateways implement a same encoding technique, i.e. generating two identical streams from same source data, if no error occurs during the generation of the streams.

The proposed solution thus makes it possible to manage the switching between the broadcast gateways in informing the switch (and if necessary other devices of the distribution and broadcast networks) if a broadcast gateway or devices located upstream are in error.

In another embodiment, the invention relates to a corresponding selection device. Such a selection device is especially adapted to implementing the selection method described here above. It could of course comprise the different characteristics of the method of selection according to the invention, which can be combined or taken in isolation.

Another embodiment of the invention relates to a method for generating a data stream intended for transmission to a selection device before possible distribution to a plurality of broadcasting sites, comprising:

the generation, in a broadcast gateway called a main broadcast gateway, of said data stream from source data, called a main stream, or the generation, in a broadcast gateway called a secondary broadcast gateway, of said data stream from source data, called a secondary stream, the generation, in said main broadcast gateway, of at least one packet comprising a piece of information representative of a quality of service associated with the main stream, at one instant at least or over one given period at least, the packet being called a main current packet, or the generation, in said secondary broadcast gateway, of at least one packet comprising a piece of information representative of a quality of service associated with the secondary stream, at said one instant at least or over said one given period at least, the packet being called a secondary current packet.

In this way, a broadcast gateway which knows especially the state of its inputs can transmit a piece of information on its state to the selection device, making it possible to help the selection device choose the stream to be distributed.

Such a method of generation is especially suited to transmitting a main stream, or a secondary stream respectively, and a main current packet, or a secondary current packet respectively, to a selection device as described here above. It could of course comprise the different characteristics of the method of selection according to the invention.

In another embodiment, the invention concerns a corresponding broadcast gateway. Such a broadcast gateway is especially adapted to implementing the method of generation described here above. It could of course comprise the different characteristics of the method of generation according to the invention, which can be combined or taken in isolation.

In particular, the techniques of selection and generation according to at least one embodiment of the invention can be implemented in various ways, especially in hardware and/or software form.

For example, at least one step of the technique of selection or generation can be implemented:

on a reprogrammable computation machine (a computer, a DSP (digital signal processor) for example, a microcontroller etc.) executing a program comprising a sequence of instructions, a dedicated computation machine (for example a set of logic gates such as an FPGA (Field Programmable Gate Array) or an ASIC (Application-Specific Integrated Circuit), or any other hardware module.

In particular, the computer program can use any programming language whatsoever and can take the form of source code, object code or intermediate code between source code and object code such as in a partially compiled form or in any other desirable form whatsoever.

One embodiment of the invention is therefore also aimed at protecting one or more computer programs comprising instructions adapted to the implementing of the methods of selection and generation as described here above when this program or these programs are executed by a processor, as well as at least one information carrier readable by a computer comprising instructions of at least one computer program as mentioned here above.

One embodiment of the invention also relates to a head-end comprising at least two broadcast gateways and a selection device as described here above.

4. LIST OF FIGURES

Other features and advantages of the invention shall appear more clearly from the following description of a particular embodiment, given by way of a simple illustratory and non-exhaustive example, and from the appended drawings of which:

FIG. 1, described with reference to the prior art, presents a block diagram of a distribution and broadcasting network according to the ATSC3.0 standard;

FIG. 2 also described with reference to the prior art, illustrates the use of two broadcast gateways to improve the security of the distribution and broadcasting networks;

FIG. 4 illustrates an example of an STL-EI packet according to one embodiment of the invention;

FIG. 5 presents an example of an RTP header of RTP packets encapsulating an STL-EI packet according to one embodiment of the invention;

FIGS. 6 and 7 respectively present the simplified structure of a switch and of a broadcast gateway according to one embodiment of the invention.

5. DESCRIPTION OF EMBODIMENTS OF THE INVENTION

5.1 General Principle

The invention is set in the context of a digital distribution and broadcasting network comprising a fixed reference site implementing at least two broadcast gateways and a switch.

The general principle of the invention relies on the transmission of additional information representative of the current state of the different broadcast gateways, enabling the switch to choose, from amongst the data streams that it receives, the data stream to be distributed to the different broadcasting sites in taking account of the quality of service associated with the different data streams.

Indeed, a certain number of problems can arise in the distribution and broadcasting chain, especially upstream to or at the broadcast gateways. For example, a broadcast gateway may lose one of its input signals, or again it may lose the reference clock that is necessary, inter alia, for the time-stamping of the data streams. The causes of these problems may be many, and they disturb the service for the final users.

The proposed solution enables a broadcast gateway to indicate, with the generated data stream, that it has encountered a problem and, if necessary, to describe the problem encountered. The proposed solution thus enables a switch to change over to a back-up stream if the main stream carries a deteriorated or failed service, or vice versa.

The proposed solution can be used especially to switch from one data stream to the other as soon as an error is detected. For example, the switch has one or more buffer memories at its disposal to temporarily store the data of the data streams that it receives from the broadcast gateways. Upon reception of the current state of the different broadcast gateways, it can thus switch directly from one data stream to another, without distributing the data stream carrying a deteriorated or failed service, through the temporary storage in buffer memory.

The proposed solution thus avoids the occurrence of an outage of services for the final user.

On the contrary, according to the ATSC 3.0 standard, the switch, situated after the broadcast gateways, has no means of detecting whether one of its broadcast gateways is generating a data stream carrying a deteriorated or failed service since the STL stream is itself encapsulated in an IP/RTP frame with no field available to indicate potential errors.

Here below, referring to FIG. 3, we describe an example of implementation of the invention.

Figure 1:
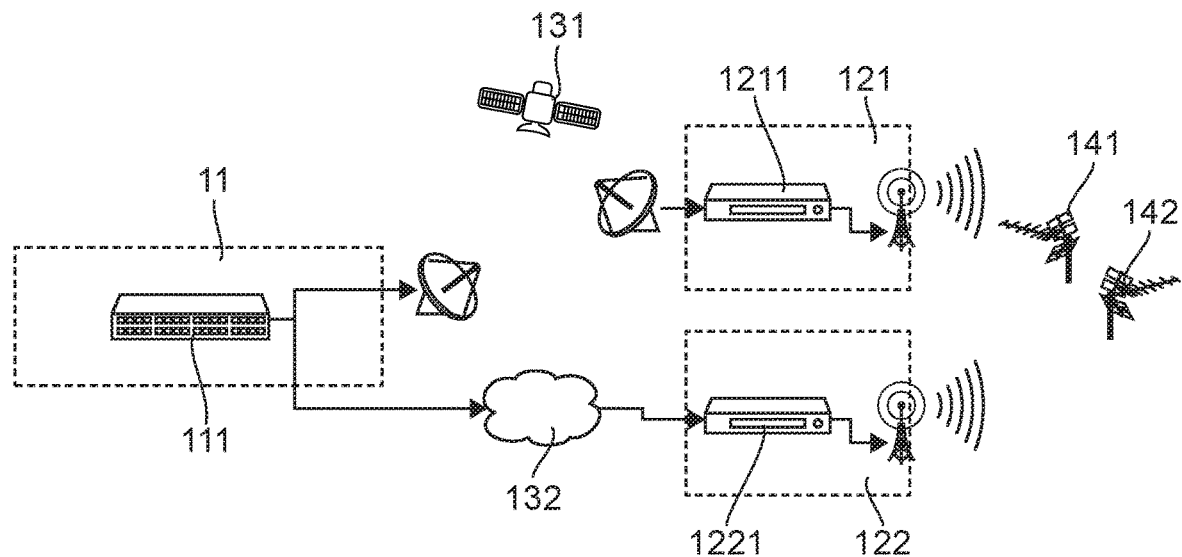
Figure 2:
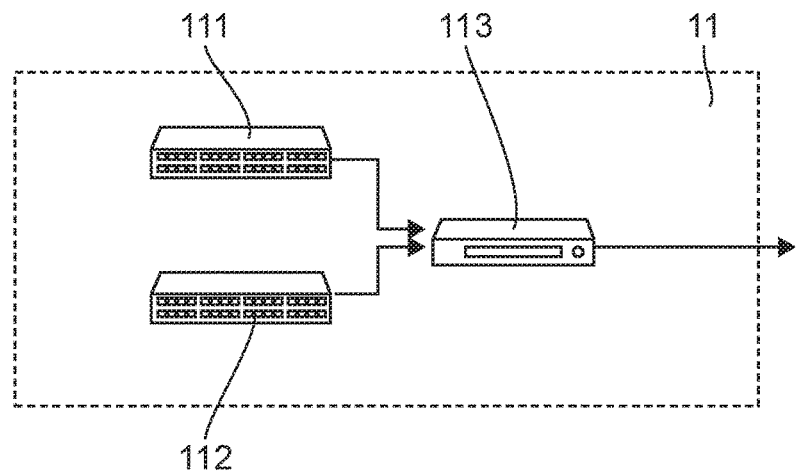
Figure 3:
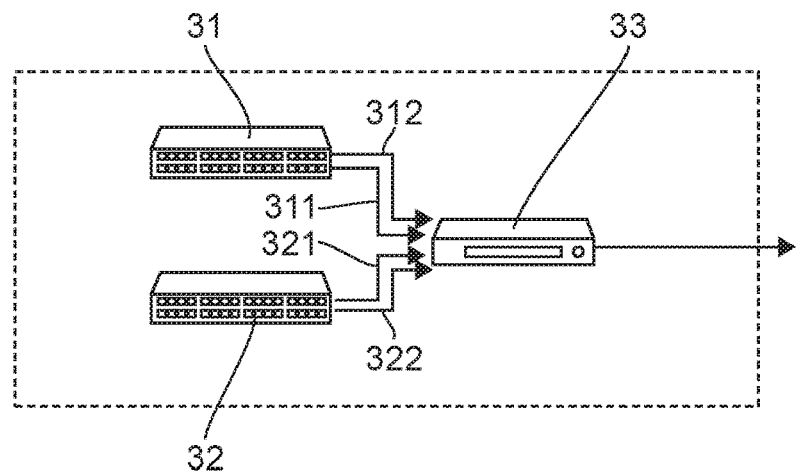
FIG. 3 illustrates an example of a head-end implementing two broadcast gateways and a switch according to one embodiment of the invention.

FIG. 3 illustrates an example of a network head-end according to one embodiment of the invention, implementing a main broadcast gateway 31 synchronized with a secondary broadcast gateway 32 and a switch 33.

Each broadcast gateway 31, 32 receives the same source data and delivers a data stream comprising for example STL packets according to the ATSC-3.0 standard, or ST2L packets as described in the French patent application no. 1755637 filed on 21 Jun. 2017. These STL or ST2L packets can especially be encapsulated in IP/RTP packets.

For example, the main broadcast gateway 31 generates a data stream, called a main stream 311, from source data. The secondary broadcast gateway 32 also generates a data stream, called a secondary stream 312, from the same source data.

If no error occurs in the main broadcast gateway 31 and the secondary broadcast gateway 32, the main stream 311 and secondary stream 321 are identical, both broadcast gateways implementing a same encoding technique. In other words, the two broadcast gateways generate a same "version" of the stream.

Each broadcast gateway also delivers at least one STL-EI (STL Error Indicator) packet giving information on the current state of the broadcast gateway and especially its inputs. Indeed, the broadcast gateway is the last device (apart from the switch) before the distribution. A broadcast gateway therefore has information on the state of the devices, signals, upstream to or at the broadcast gateway, and therefore makes it possible to obtain a piece of information on the quality of service of the broadcast.

This STL-EI packet or these STL-EI packets can especially be encapsulated in one or more IP/RTP packets.

For example, the main broadcast gateway 31 generates at least one STL-EI packet comprising a piece of information representing a quality of service associated with the main stream 311, at one instant at least or over one given period at least, called a main current packet 312. The secondary broadcast gateway 32 also generates at least one STL-EI packet comprising a piece of information representative of a quality of service associated with the secondary stream 321, at the same instant or on the same period, called a secondary current packet 322.

Such main current 312 and secondary current 322 packets can be generated (and transmitted to the switch 33) periodically, for example every second and possibly instantaneously when a change in a state of the main broadcast gateway 31 and/or secondary broadcast gateway 32 occurs, for example when an error is detected. In this way, the current state of the main broadcast gateway 31 and secondary broadcast gateway 32 is permanently available.

According to a first embodiment, the main current packet 312 is transmitted in the main stream 311, and the secondary current packet 322 is transmitted in the secondary stream 321.

According to a second embodiment, the main current packet 312 is transmitted in a signal distinct from the main stream 311 and the secondary current packet 322 is transmitted in a signal distinct from the secondary stream 321. In the case of an IP transmission, for example, the main current packet 312, and the secondary current packet 322 respectively, can be encapsulated in IP packets, the destination UDP port of which is different from the destination UDP port of the IP packets encapsulating the main stream 311, and the secondary stream 321 respectively.

Thus, the generation and the transmission of the main current packet 312, and the secondary current packet 321, respectively do not disturb the devices downstream from the main broadcast gateway, and the secondary broadcast gateway respectively.

In this way, the switch 33 receives:
- the main stream 311 generated by the main broadcast gateway 31,
- the main current packet 312 generated by the main broadcast gateway 31,
- the secondary stream 321 generated by the secondary broadcast gateway 32,
- the secondary current packet 322 generated by the secondary broadcast gateway 32.

The switch 33 can then select the main stream or the secondary stream in real time in taking account of the main and secondary current packets to distribute the selected streams to a plurality of broadcasting sites.

5.2 Example of a STL-EI Packet

Here below, referring to FIGS. 4 and 5, an example is described of an STL-EI packet (main and secondary current packet) according to the invention.

Such an STL-EI packet carries at least one indicator indicating whether at least one error has been detected by the broadcast gateway generating it (for example an indicator equal to 1 if an error has been detected and equal to 0 if not) and/or at least one indicator indicating a type of error detected by the broadcast gateway generating it. In particular, such an STL-EI packet contains a list of the alerts sent back by the broadcast gateway.

For example, as illustrated in FIG. 4, the payload data of an STL-EI packet comprise:
- an field denoted as XO and referenced 41 indicating a desynchronization of the internal clock (related for example to the loss of a GPS type reference signal conventionally used for time-stamping). For example, such a field is equal to 1 if the loss of a reference signal is detected, or if not it is equal to 0 or empty;
- one or more fields denoted as PLP O and referenced 42, indicating an overflow of the source data relative to the size of a channel. For example, if the transport stream generated by a broadcast gateway comprises 64 PLP channels, a field PLP O<0> indicates whether the PLP indexed 0 is under-sized for its content, a field PLP O<1> indicates whether the PLP indexed 1 is under-sized for its content, . . . , a field PLP O<63> indicates whether the PLP indexed 63 is under-sized for its content. For example, such a field PLP O is equal to 1 if an overflow is detected and it is equal to 0 or empty if not;

one or more fields denoted as PLP NOS and referenced 43, indicating a loss of the source data. For example, if the transport stream generated by a broadcast gateway comprises 64 PLP channels, a field PLP NOS <0> indicates whether the PLP indexed 0 contains source data (i.e. the availability of the input signal of the PLP indexed 0), a field PLP NOS <1> indicates whether the PLP indexed 1 contains source data (i.e. the availability of the input signal of the PLP indexed 1), . . . , a field PLP NOS<63> indicates whether the PLP indexed 63 contains source data (i.e. the availability of the input signal of the PLP indexed 63). For example, such a field PLP NOS is equal to 1 if a loss of the input signal is detected, and it is equal to 0 or is empty if not.

one or more reserved fields denoted as RES and referenced 44, especially dedicated to subsequent developments like the increase in the number of PLPs for example.

The packet STL-EI thus carries a piece of information representing the level of quality of service of the broadcast, since it carries a piece of information on the type(s) of error(s) affecting the data stream generated by the same broadcast gateway.

Thus, if we consider that the data stream generated by a broadcast gateway comprises 64 PLP channels, 129 cases of possible errors are defined (loss of reference signal, possible under sizing of the 64 PLP channels, possible loss of source data for the 64 PLP channels) and can be indicated in the STL-EI packet generated by the broadcast gateway.

It can be noted that the STL-EI packet is transmitted to the switch 33 permanently (i.e. periodically for example every second) even if no error is detected by the broadcast gateway.

Such an STL-EI packet can especially be encapsulated in one or more RTP packets. The STL-EI packet can therefore be fractioned among several RTP packets.

Thus, as illustrated in FIG. 5, the RTP header of the RTP packets encapsulating the STL-EI packet comprises:
- a reserved field RES, referenced 51,
- an STL-EI PV field, referenced 52, indicating the version of the STL-EI packet. For example, the initial version (version 0) of the STL-EI packet is illustrated in FIG. 4. Other versions can be envisaged, especially if other possible cases of error are defined. In this case, the STL-EI packet can have a different structure and this STL-EI PV field enables the devices receiving the STL-EI packet (the switch especially) to know the structure of the STL-EI packet and to adapt thereto;
- a P CC packet, referenced 53, bearing the value of the counter of the current RTP packet. This counter starts at 0 and counts up to the total number of RTP packets transporting the STL-EI packet. In other words, the current counter represents the index of the fragment of the current STL-EI packet;
- a P N field, referenced 54, indicating the total number of RTP packets carrying the STL-EI packet.

The other fields V, P, X, CC, M, PT (Payload Type), SN (Sequence Number), and TS(0) (Timestamp (0)), are classic features of the RTP header. They are not described in greater detail here.

The RTP packets can be encapsulated in UDP packets which are themselves encapsulated in IP packets. Such encapsulation is classic and is not described in greater detail.

In particular, a cyclic redundancy check mechanism (CRC mechanism) can be implemented to detect, on the switch side, if the STL-EI packet received is corrupt.

For example, the broadcast gateway generating the STL-EI packet computes a piece of redundancy information from the payload data of the STL-EI packet and of the RTP header of the RTP packets encapsulating the STL-EI packet. This piece of redundancy information is transmitted to the switch. At reception of the STL-EI packet, the switch also computes a piece of redundancy information from the payload data of the STL-EI packet received and from the RTP header of the RTP packets encapsulating the STL-EI packet received and compares this redundancy information with the redundancy information transmitted by the broadcast gateway. If the two pieces of redundancy information are identical, then the STL-EI packet is considered to be reliable. If not, the STL-EI packet is considered to be corrupt, and the switch can choose to wait for the next STL-EI packet to decide whether or not it must switch over to the other data stream.

Such a cyclic redundancy check mechanism is for example implemented on 32 bits according to the polynomial: $x^{32}+x^{21}+x^{16}+x^{11}+1$.

In particular, the destination port used by an STL-EI packet in the UDP header (for example corresponding to the destination port of the data stream+6) is not used by the other devices of the distribution and broadcast network. The STL-EI packets are therefore ignored by the other devices of the distribution and broadcasting network and do not disturb them.

Furthermore, the additional flow rate generated by the sending of STL-EI packets is negligible.

At reception of the STL-EI packets (main current packet 312 indicating the current state of the main broadcast gateway 31 and secondary current packet 322 indicating the current state of the secondary broadcast gateway 32), the switch 33 can choose whether it is preferable to distribute the main stream 311 or the secondary stream 321 to the different broadcasting sites.

In particular, it is possible to classify the errors indicated in the STL-EI packet in taking account of their type. For example, a loss of the source data (on at least one PLP) is more troublesome than a loss of the reference signal in terms of service quality for the final user. Similarly, a loss of source data (on at least one PLP) is more troublesome than an under-sizing of at least one PLP in terms of quality of service for the final user. Finally, an under-sizing of at least one PLP is more troublesome than a loss of reference signal in terms of quality of service for the final user.

The selection of the data stream to be distributed can then take this classification into account. For example:
- if the main current packet 312 indicates the loss of a reference signal (field XO equal to 1) and if the secondary current packet 322 indicates no error, the switch 33 selects the secondary stream 321 and distributes this secondary stream 321 to the different broadcasting sites;
- if the main current packet 312 indicates the loss of a reference signal (field XO equal to 1) and if the secondary current packet 322 indicates the loss of source data (for example field PLP NOS <0> equal to 1), the switch 33 selects the main stream 311 and distributes this main stream 311 to the different broadcasting sites;
- if the main current packet 312 indicates the loss of source data for a PLP (for example field PLP NOS <10> equal to 1) and if the secondary current field 322 indicates an overflow for several PLPs (for example fields PLP O<12> equal to 1 and PLP O<63> equal to 1), the switch 33 selects the secondary stream 321 and distributes this secondary stream 321 to the different broadcasting sites;

etc.

According to the above examples, the switch 33 can therefore give preference to the selection of the data stream showing the most errors, if the errors associated with this data stream are considered to have lower priority, i.e. they are less troublesome in terms of quality of service especially.

The use of STL-EI packets thus offers flexibility in the choice of the criteria of selection of the data stream to be distributed, and the possibility of assigning priorities (or a level of severity) to each error to decide when to switch from one data stream to the other, for example in selecting the data stream offering the best quality of service at a given instant.

The switch 33 thus has criteria of selection enabling it to choose the data stream adapted to the required service level, and therefore to manage the case where the two broadcast gateways are in failure simultaneously. These selection criteria can be defined by the operator and configured beforehand. The proposed technique therefore enables the operator to define and offer different levels of service.

In particular, it can be noted that the passage from the main stream to the secondary stream or the return to the main stream is done transparently relative to the other devices of the distribution and broadcasting network, so as not to disturb the broadcasting of the programs. Indeed, if the switchover is not done transparently, the modulators of the broadcasting sites risk getting desynchronized, thus prompting a complete outage of the television signal for example throughout the zone covered.

5.3 Devices

Referring now to FIGS. 6 and 7, we present the simplified structure of a switch and of a broadcast gateway according to one embodiment of the invention.

As illustrated in FIG. 6, a switch according to one embodiment of the invention comprises a memory 61 (comprising for example a buffer memory) and a processing unit 62 (equipped for example with at least one processor, FPGA, or DSP), driven or pre-programmed by an application or a computer program 63 implementing the method for selecting a transport stream intended for distribution to a plurality of broadcasting sites according to one embodiment of the invention.

At initialization, the code instructions of the computer program 63 are for example loaded into a RAM and then executed by the processing unit 62. The processing unit 62 inputs at least two data streams and two corresponding STL-EI packets at a given instant. The processing unit 62 implements the steps of the method of selection described here above, according to the instructions of the computer program 63, to select, from amongst the incoming data streams, the data stream to be distributed to the broadcasting sites.

To this end, according to one embodiment, the processing unit 62 is configured to:

receive a main stream generated by a main broadcast gateway from source data, and receive a secondary stream generated by a secondary broadcast gateway from said source data, receive at least one packet comprising a piece of information representing a quality of service associated with the main stream, at one instant at least or over one given period at least, said at least one packet, called a main current packet, being generated by said main broadcast gateway, and receive at least one packet comprising a piece of information representing a quality of service associated with the secondary stream, at said one instant at least or over said one given period at least, said at least one packet, called a secondary current packet, being generated by said secondary broadcast gateway, select in real time the main stream or the secondary stream in taking account of said main and secondary current packets, delivering the data stream intended for distribution to a plurality of broadcasting sites.

As illustrated in FIG. 7, a broadcast gateway according to one particular embodiment of the invention comprises a memory 71 (comprising for example a buffer memory) and a processing unit 72 (equipped for example with at least one processor, FPGA or DSP) driven or pre-programmed by an application or a computer program 73 implementing the method for generating a data stream intended for transmission to a selection device before the distribution, if any, to a plurality of broadcasting sites according to one embodiment of the invention.

At initialization, the code instructions of the computer program 73 are for example loaded into a RAM and then executed by the processing unit 72. The processing unit 72 inputs source data and a reference signal (for example of the GPS type). The processing unit 72 implements the steps of the method for generating a data stream described here above, according to the instructions of the computer program 73, to generate a data stream (main stream or secondary stream) and at least one STL-EI packet (main current packet or secondary current packet). To this end, according to one embodiment, the processing unit 72 is configured to:

generate a data stream from source data, called a main stream, or a secondary stream respectively, generate at least one packet comprising information representing a quality of service associated with the main stream, or the secondary stream respectively, at one instant at least or over one given period at least, called a main current packet, or a secondary current packet respectively.

5.4 Variants

Here above, we have described an example of implementation of the invention according to the ATSC-3 standard. Naturally, other broadcasting standards can be envisaged.

It can be noted besides that we have described the implementing, on the fixed reference site, of two broadcast gateways but more than two broadcast gateways can be used. In this case, the criteria of selection/rules of priority can be adapted to the number of broadcast gateways.

Similarly, we have described the implementing of the method of selection at a switch and the method of generation of a transport stream and of STL-EI packets at a broadcast gateway. Naturally, certain steps can be implemented in the "cloud" by one or more remote servers, communicating for example by the Internet network. The implementing of certain operations in the "cloud" can especially simplify the devices of the distribution and broadcasting network.

Finally, the STL-EI packets can be used by devices of the distribution and broadcasting network other than the switch, in order to obtain information on the state of the broadcast (namely the state of the broadcast gateways) and, if necessary, to associate actions with them.

The invention claimed is:

1. A method for selecting a data stream intended for distribution to a plurality of broadcasting sites, comprising, in a selection device:

receiving, from a main broadcast gateway, a main data stream, generated by the main broadcast gateway from source data, called a main stream, receiving, from a secondary broadcast gateway, a back-up data stream, generated by the secondary broadcast gateway from said source data, called a secondary stream, selecting said main stream or said secondary stream delivering the data stream intended for distribution to a plurality of broadcasting sites, receiving, from the main broadcast gateway, at least one packet comprising a state of at least one input of the main broadcast gateway, said at least one packet, called a main current packet, being generated by said main broadcast gateway, and receiving, from the secondary broadcast gateway, at least one packet comprising a state of at least one input of the secondary gateway, said at least one packet, called a secondary current packet, being generated by said secondary broadcast gateway, wherein said main current packet and said secondary current packet each comprises at least:
- a field to indicate whether there is a loss of a reference signal,
- a field to indicate whether there is an overflow of said source data, and
- a field to indicate whether there is a loss of said source data, and wherein said selecting makes a real-time selection of said main stream or said secondary stream in taking account of said main and secondary current packets.

2. The method for selecting according to claim 1, wherein at least one of said main current packet or said secondary current packet carries at least one indicator indicating whether at least one error has been detected by said main broadcast gateway or said secondary broadcast gateway.

3. The method for selecting according to claim 1, wherein at least one of said main current packet or said secondary current packet carries at least one indicator indicating a type of error detected by said main broadcast gateway or said secondary broadcast gateway.

4. The method for selecting according to claim 3, wherein said errors are classified in taking account of their type, and wherein said selection takes account of this classification to select said main stream or said secondary stream.

5. The method for selecting according to claim 1, wherein the at least one input of the main broadcast gateway or secondary broadcast gateway comprises at least one of the source data or a reference signal used for time-stamping.

6. A method for generating a data stream intended for transmission to a selection device before a possible distribution to a plurality of broadcasting sites, comprising:

generating, in a broadcast gateway, said data stream from source data, transmitting said data stream to a selection device, generating, in said broadcast gateway, at least one packet comprising a state of at least one input of the broadcast gateway, wherein said at least one packet comprises at least:
- a field to indicate whether there is a loss of a reference signal,
- a field to indicate whether there is an overflow of said source data, and
- a field to indicate whether there is a loss of said source data, and transmitting said at least one packet to the selection device.

7. The method for generating according to claim 6, wherein said packet is generated when a change in a state of said broadcast gateway occurs.

8. The method according to claim 6, wherein said packet is generated periodically.

9. The method according to claim 6, wherein said packet is transmitted in said data stream.

10. The method according to claim 6, wherein said packet is transmitted in a signal distinct from said data stream.

11. The method according to claim 6, wherein said data stream is of an STL (studio-to-transmitter) or ST2L type.

12. The method according to claim 6, wherein said broadcast gateway is a main broadcast gateway, said data stream is a main stream, and said packet is a main current packet.

13. The method according to claim 6, wherein said broadcast gateway is a secondary broadcast gateway, said data stream is a secondary stream, and said packet is a secondary current packet.

14. A device for selecting a data stream intended for distribution to a plurality of broadcasting sites, comprising:

at least one processor coupled operationally to a memory and configured to:

receive, from a main broadcast gateway, a main data stream, generated by the main broadcast gateway from source data, called a main stream, receive, from the main broadcast gateway, at least one packet comprising a state of at least one input of the main broadcast gateway, said at least one packet, called a main current packet, being generated by said main broadcast gateway, receive, from a secondary broadcast gateway, a backup data stream, generated by the secondary broadcast gateway from said source data, called a secondary stream, receive, from the secondary broadcast gateway, at least one packet comprising a state of at least one input of the secondary broadcast gateway, said at least one packet, called a secondary current packet, being generated by said secondary broadcast gateway, and select in real time said main stream or said secondary stream, in taking account of said main and secondary current packets, delivering the data steam intended for distribution to a plurality of broadcasting sites, wherein said main current packet and said secondary current packet each comprises at least:
- a field to indicate whether there is a loss of a reference signal,
- a field to indicate whether there is an overflow of said source data, and
- a field to indicate whether there is a loss of said source data.

15. A broadcast gateway for generating a data stream intended for transmission to a selection device before a possible distribution to a plurality of broadcasting sites, comprising:

at least one processor coupled operationally to a memory, and configured to:

generate said data stream from source data, transmit said data stream to the selection device, generate at least one packet comprising a state of at least one input of said broadcast gateway, wherein said at least one packet comprises at least:
- a field to indicate whether there is a loss of a reference signal,
- a field to indicate whether there is an overflow of said source data, and a field to indicate whether there is a loss of said source data, and transmit said at least one packet to the selection device.

16. A non-transitory computer-readable medium comprising instructions stored thereon which when executed by a device for selecting a data stream configure the device to select a data stream for distribution to a plurality of broadcasting sites, wherein the device is configured to:
  receive, from a main broadcast gateway, a main data stream, generated by the main broadcast gateway from source data, called a main stream,
  receive, from a secondary broadcast gateway, a back-up data stream, generated by the secondary broadcast gateway from said source data, called a secondary stream,
  select said main stream or said secondary stream delivering the data stream intended for distribution to a plurality of broadcasting sites,
  receive, from the main broadcast gateway, at least one packet comprising a state of at least one input of the main broadcast gateway, said at least one packet, called a main current packet, being generated by said main broadcast gateway, and
  receive, from the secondary broadcast gateway, at least one packet comprising a state of at least one input of the secondary broadcast gateway, at said one instant at least or over said one given period at least, said at least one packet, called a secondary current packet, being generated by said secondary broadcast gateway,
  wherein said main current packet and said secondary current packet each comprises at least:
    a field to indicate whether there is a loss of a reference signal,
    a field to indicate whether there is an overflow of said source data, and
    a field to indicate whether there is a loss of said source data,
  and wherein said selecting makes a real-time selection of said main stream or said secondary stream in taking account of said main and secondary current packets.

* * * * *